(12) United States Patent
Agarwal et al.

(10) Patent No.: US 11,907,660 B2
(45) Date of Patent: Feb. 20, 2024

(54) IDENTIFYING DOCUMENTS THAT CONTAIN POTENTIAL CODE WORDS USING A MACHINE LEARNING MODEL

(71) Applicant: Text IQ, Inc., New York, NY (US)

(72) Inventors: Apoorv Agarwal, New York, NY (US); Ethan Benjamin, New York, NY (US); Jasneet Sabharwal, Vancouver (CA)

(73) Assignee: TEXT IQ, INC., New York, NY (US)

( * ) Notice: Subject to any disclaimer, the term of this patent is extended or adjusted under 35 U.S.C. 154(b) by 0 days.

(21) Appl. No.: 18/181,406

(22) Filed: Mar. 9, 2023

(65) Prior Publication Data

US 2023/0214595 A1   Jul. 6, 2023

Related U.S. Application Data

(63) Continuation of application No. 16/786,427, filed on Feb. 10, 2020, now Pat. No. 11,625,534.

(Continued)

(51) Int. Cl.
| | |
|---|---|
| *G06V 30/41* | (2022.01) |
| *G06F 18/20* | (2023.01) |
| *G06F 40/10* | (2020.01) |
| *G06F 40/194* | (2020.01) |
| *G06F 40/45* | (2020.01) |
| *G06F 40/289* | (2020.01) |

(Continued)

(52) U.S. Cl.
CPC ............ *G06F 40/289* (2020.01); *G06F 18/22* (2023.01); *G06N 20/00* (2019.01); *G06V 30/414* (2022.01)

(58) Field of Classification Search
USPC ............ 382/154–231; 704/1–275; 706/1–62, 706/900–903; 707/706–783
See application file for complete search history.

(56) References Cited

U.S. PATENT DOCUMENTS

| | | | |
|---|---|---|---|
| 7,958,136 B1 * | 6/2011 | Curtis | G06F 16/313 707/758 |
| 7,970,773 B1 * | 6/2011 | Thirumalai | G06F 40/194 707/917 |

(Continued)

OTHER PUBLICATIONS

Lagi Marco; Methods and Systems for Automated Generation of Personalized Messages, Nov. 15, 2018 (Year: 2018).*

(Continued)

*Primary Examiner* — Marcellus J Augustin
(74) *Attorney, Agent, or Firm* — Maschoff Brennan (57) ABSTRACT

Identifying documents that contain potential code words using a machine learning model. In some embodiments, a method may include receiving documents, identifying a first corpus and a second corpus in the documents, extracting a first set of word embeddings from the first corpus and a second set of word embeddings from the second corpus, generating a first vector space for the first set of word embeddings and a second vector space for the second set of word embeddings using a machine learning model, performing a vector rotation to improve alignment of the first set of word embeddings with the second set of word embeddings, identifying a word embedding in the first vector space that is not aligned with a corresponding word embedding in the second vector space as a potential code word, and identifying one or more documents that contain the potential code word in the first corpus.

20 Claims, 6 Drawing Sheets

Related U.S. Application Data (60) Provisional application No. 62/804,347, filed on Feb. 12, 2019.

(51) Int. Cl.
*G06N 20/00* (2019.01)
*G06V 30/414* (2022.01)
*G06F 18/22* (2023.01)

(56) References Cited

U.S. PATENT DOCUMENTS

| | | | |
|---|---|---|---|
| 8,473,510 B1* | 6/2013 | Tong | G06F 40/10 |
| | | | 707/769 |
| 9,015,153 B1 | 4/2015 | Zhang | |
| 9,037,464 B1 | 5/2015 | Mikolov et al. | |
| 10,803,245 B2 | 10/2020 | Alonso et al. | |
| 10,936,827 B1* | 3/2021 | Gupta | G06F 40/45 |
| 11,080,336 B2 | 8/2021 | Van Dusen | |
| 11,275,794 B1 | 3/2022 | Rajpara | |
| 11,625,534 B1* | 4/2023 | Agarwal | G06N 20/00 |
| | | | 704/9 |
| 2015/0046420 A1* | 2/2015 | Barney | G06F 16/24578 |
| | | | 707/706 |
| 2017/0011481 A1 | 1/2017 | Morimoto et al. | |
| 2018/0082197 A1* | 3/2018 | Aravamudan | G06F 40/30 |
| 2018/0248895 A1 | 8/2018 | Watson et al. | |
| 2018/0285339 A1 | 10/2018 | Bostick et al. | |
| 2019/0220937 A1* | 7/2019 | Brestoff | G06Q 50/18 |
| 2019/0251150 A1 | 8/2019 | Vinay et al. | |
| 2019/0332619 A1 | 10/2019 | De Sousa Webber | |
| 2020/0042597 A1 | 2/2020 | Wu | |

OTHER PUBLICATIONS

Mikolov et al.; "Distributed Representations of Words and Phrases and the Compositionality"; white paper; published in NIPS 2013; 9 pages.

Smith et al.; "Offline Bilingual Work Vectors, Orthogonal Transformations and the Inverted Softmax" white paper; published in ICLR 2017; 10 pages.

Gopalan et al.; "Efficient Discovery of Overlapping Communities in Massive Networks"; research article; published in Proceedings of the National Academy of Sciences of the United States of America; Sep. 3, 2013; 6 pages.

* cited by examiner

| Vector Pair Comparison | Similarity Score |
|---|---|
| V1 and V2 | .94 |
| V2 and V3 | .92 |
| V1 and V3 | .88 |
| V3 and V4 | .18 |
| V1 and V4 | .14 |
| V2 and V4 | .12 |

Figure 6

IDENTIFYING DOCUMENTS THAT CONTAIN POTENTIAL CODE WORDS USING A MACHINE LEARNING MODEL

CROSS-REFERENCE TO A RELATED APPLICATION

This application is a continuation of U.S. patent application Ser. No. 16/786,427, filed on Feb. 10, 2020, which claims the benefit of, and priority to, U.S. Provisional Application No. 62/804,347, filed Feb. 12, 2019, the disclosures of each of which are hereby incorporated herein by this reference in their entireties.

BACKGROUND

A code word may be a word that is used to convey meaning different from its traditional, normal, or commonly accepted meaning. As an example, a group of financial traders may use an unrelated word (e.g., "racecar") as a code word to indicate insider information. Typically, the meaning of a particular word may be related to, and discerned from, the context in which the particular word is used, or from the other words that surround the particular word in its usage. For example, the word "racecar" when used consistently with its normal meaning would be expected to appear around other words related to the same subject matter, such as "driver," "fast," or "racetrack." On the other hand, the word "racecar" when used as a code word for insider information may appear around a different and unrelated set of words such as "buy," "sell," and "profit."

Code words are typically used by a subset of a larger community of people. For example, traders using the code word "racecar" for insider trading may be a subset of a company's employees, rather than the entire employee roster of the company. The users of a code word may be referred to as insiders, whereas those who are not aware of the code word may be referred to as outsiders. Code words are secretive by nature, so that only a limited group of people are aware of the secret meaning and use of the code word. Accordingly, the users of the code word may often be a particular subset of people within a larger community of people that do not use the code word.

Code words may be difficult to detect for various reasons. As an example, a code word may not be obvious because the code word's secret meaning may not be significantly different from the code word's normal meaning. Thus, even if an outsider were to see insiders communicate using the code word, the outsider may not readily understand that the code word is not being used consistent with its normal meaning. In another example, the insiders using the code word may not use the code word consistently in their communications, such as where the insiders sometimes use a word as a code word and other times use the same word consistent with its normal meaning. Thus, it may be unclear whether a particular use of the word is as a code word or is simply consistent with its normal meaning.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for identifying documents that contain potential code words using a machine learning model may be performed by a computer system comprising one or more processors. The method may include receiving, by the computer system, documents from one or more document databases. The method may also include identifying, by the computer system, a first corpus and a second corpus in the documents. The method may further include extracting, by the computer system, a first set of word embeddings from the first corpus and a second set of word embeddings from the second corpus. The method may also include generating, by the computer system, a first vector space for the first set of word embeddings, and a second vector space for the second set of word embeddings, using a machine learning model. The method may further include performing, by the computer system, a vector rotation to improve alignment of the first set of word embeddings in the first vector space with the second set of word embeddings in the second vector space. The method may also include identifying, by the computer system, a word embedding in the first vector space, that is not aligned with a corresponding word embedding in the second vector space, as a potential code word. The method may further include identifying, by the computer system, one or more documents that contain the potential code word in the first corpus.

In some embodiments, the identifying of the word embedding as the potential code word may further include identifying the word embedding as the potential code word where an alignment score between the first vector space and the second vector space is below a threshold.

In some embodiments, the generating of the first vector space and of the second vector space using a machine learning model may further include generating the first vector space and the second vector space using a Word2Vec machine learning model.

In some embodiments, the performing of the vector rotation may further include performing an orthogonal linear transformation.

In some embodiments, the identifying of the word embedding in the first vector space, that is not aligned with the corresponding word embedding in the second vector space, may further include performing a cosine similarity comparison.

In some embodiments, the identifying of the first corpus and the second corpus may further include identifying documents in which a first community of people is communicating as the first corpus and identifying documents in which a second community of people is communicating as the second corpus.

In some embodiments, the documents may include emails.

In some embodiments, a computer-implemented method for identifying documents that contain potential code words using a machine learning model may be performed by a computer system comprising one or more processors. The method may include receiving, by the computer system, documents from one or more document databases. The method may also include identifying, by the computer system, multiple corpuses in the documents. The method may further include extracting, by the computer system, multiple sets of word embeddings from the multiple corpuses, with each corpus in the multiple corpuses having a unique set of word embeddings. The method may also include generating, by the computer system, multiple vector spaces for the multiple sets of word embeddings using a machine learning model, with each set of word embeddings in the multiple sets of word embeddings having a unique vector space. The method may further include performing, by the computer system, a vector rotation of one or more vector spaces in the multiple vector spaces to improve alignment of the multiple vector spaces. The method may also include identifying, by the computer system, a word embedding in a first one of the vector spaces in the multiple vector spaces, that is not aligned with a corresponding word embedding in one or more of the other vector space(s) in the multiple vector spaces, as a potential code word. The method may further include identifying, by the computer system, one or more documents that contain the potential code word in the corpus corresponding to the first one of the vector spaces.

In some embodiments, the identifying of the word embedding as the potential code word may further include identifying the potential code word where an alignment score between the first one of the vector spaces and the one or more of the other vector space(s) is below a threshold.

In some embodiments, the generating of the multiple vector spaces using a machine learning model may further include generating the multiple vector spaces using a Word2Vec machine learning model.

In some embodiments, the performing of the vector rotation may further include performing an orthogonal linear transformation.

In some embodiments, the identifying of the word embedding in the first one of the vector spaces, that is not aligned with the corresponding word embedding in the one or more of the other vector spaces, may include performing a cosine similarity comparison.

In some embodiments, the documents may include emails.

In some embodiments, one or more non-transitory computer-readable media may include one or more computer-readable instructions that, when executed by one or more processors of a computer system, cause the computer system to perform a method for identifying documents that contain potential code words using a machine learning model.

It is to be understood that both the foregoing summary and the following detailed description are explanatory and are not restrictive of the invention as claimed.

BRIEF DESCRIPTION OF THE DRAWINGS

Embodiments may be described and explained with additional specificity and detail through the use of the accompanying drawings in which.

DETAILED DESCRIPTION

Code words may be difficult to detect for various reasons. Further, identifying code words in a target corpus may have varying levels of complexity.

As a first example, a code word may be used between just two insiders or it may be used by a very large number of insiders. As the number of insiders who use a code word increases, it may become more difficult to detect the code word within the larger number of communications that take place using the code word. In addition, the more insiders who use a code word, the more likely it may be that the code word is being using inconsistently and in different contexts by the larger number of people.

As a second example, a code word may not be obvious. For example, the difference between the word's coded meaning and its normal meaning may not be different enough to clearly and consistently identify if and when it is being used as a code word. For example, if the code word "Ford" was used to refer to a "Chevrolet," it may be difficult to identify the code word because its code word meaning is fairly similar to its normal meaning. However, the use of the code word "raptor" to indicate insider trading may be more obvious because the word's coded meaning and its normal meaning are very different.

As a third example, the people using the code word in the communications may not use the word consistently. In the target corpus, the insiders using a particular term as a code word may sometimes also use the same term in its normal meaning. It may be that the insiders only adopted the term as a code word after a certain date, and prior to that date the term was being used in the corpus in its normal meaning. Or the people using the code word may sometimes still use the term in its normal meaning because it is a commonly used word. The inconsistent use of a code word in a target corpus may make identifying the term as a code word more difficult.

In addition, code words may be difficult to identify because they may involve more than a single issue of complexity. For example, using the complexities discussed above, a code word may be used by a large number of people and it may also be non-obvious. Or a code word may be used by a large number of people, may be used inconsistently over time, and may also be a non-obvious code word. These combinations of complexities may make it more difficult to identify a code word in a target corpus.

Some embodiments disclosed herein may enable identifying documents that contain potential code words using a machine learning model. For example, potential code words may be detected in a corpus. In some embodiments, a first process may be performed to convert word embeddings in a target corpus into a vector space, and a second process may be performed to convert word embeddings in a reference corpus to another vector space. The reference corpus may be from a publicly available source that is not known to contain code words. A vector rotation may be performed to improve the alignment between the word embeddings of the two vectors spaces. After the vector rotation is performed, the vector space representation of the word embeddings in the target corpus may be compared with the vector space representation of the word embeddings in the reference corpus. The word embeddings that do not align in the comparison may be identified as potential code words in the target corpus.

In another example, the documents may be received from a document database, where the documents represent a first corpus and a second corpus. A first set of words may be extracted from the first corpus, and a second set of words may be extracted from the second corpus. The words from the first corpus may be converted into a first vector space representation, and the words from the second corpus may be converted into a second vector space representation. One or more of the vector space representations may be rotated to improve the alignment of the words between the two vector space representations. Words in the rotated first vector space representation that are not aligned with the same words in the second vector space may be identified as potential code words. Alternatively, an alignment score may be calculated for each word by comparing the alignment of the words in the two rotated vector spaces. Words may be labelled as potential code words if their alignment score is below a certain threshold.

In some embodiments, an initial step may include determining and/or defining a reference corpus and a target corpus. The target corpus may be a corpus that may contain potential code words in its vocabulary, and may also be referred to as a code word corpus or a test corpus. The reference corpus may not be expected to have code words within its vocabulary. The reference corpus may be a corpus that is available from a public source that is not known to contain code words (such as a newspaper, periodical, or other publicly available corpus).

In some embodiments, code words in a target corpus may have a different meaning than the same words in a reference corpus. As an example, the term "raptor" may be used as a code word in a target corpus to indicate insider trading. However, the same term "raptor" may be expected to be used in its normal or traditional manner in the reference corpus (i.e., to indicate a type of dinosaur, or the name of a sports team). The difference in the use of the term "raptor" between the two corpuses may be because the target corpus is the vocabulary of a group of people who are engaging in insider trading using the term as a code word, while the reference corpus is the vocabulary of a newspaper or other publicly available collection of documents.

Figure 1:
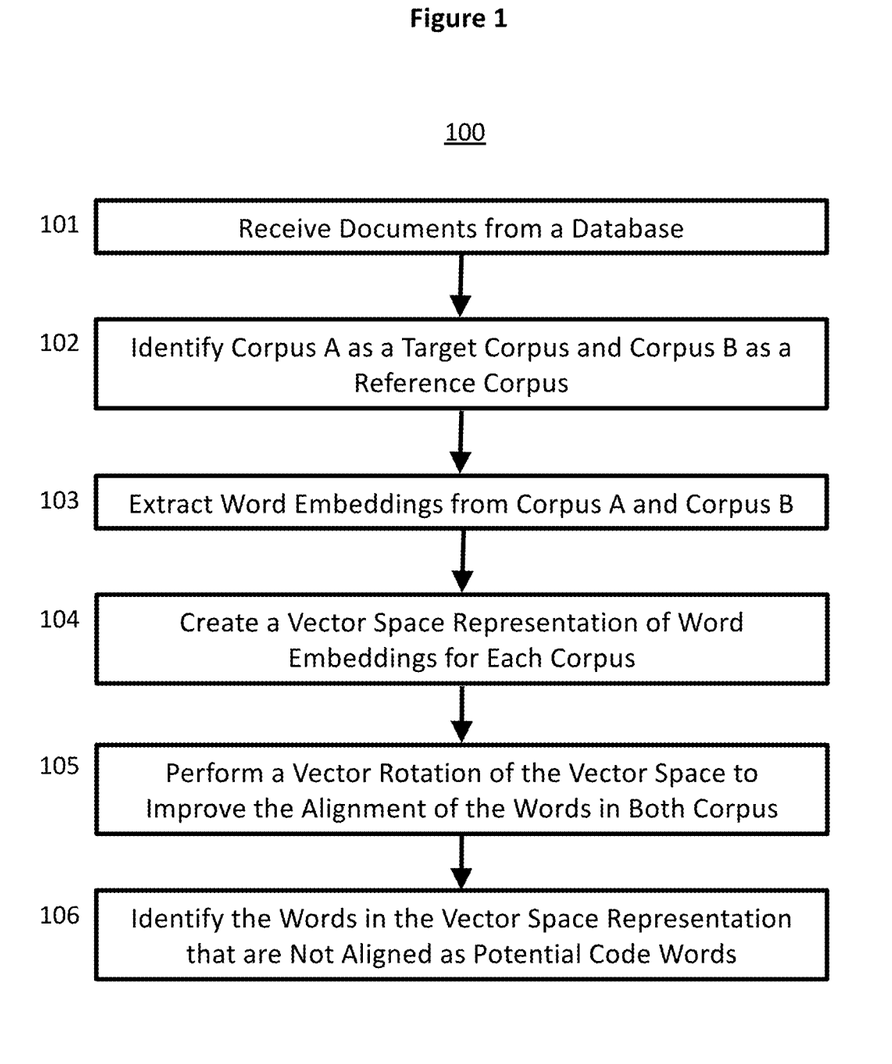
FIG. 1 is a flowchart of example method for reviewing corpuses of electronic communications to identify potential code words.

FIG. 1 illustrates some embodiments for reviewing corpuses of electronic communications to identify potential code words. For example, FIG. 1 illustrates a flowchart of an example method 100 for reviewing corpuses of electronic communications to identify potential code words. One or more of the operations of the method 100 may be performed, in some embodiments, by any suitable another device or system described in this disclosure. In these and other embodiments, the method 100 may be performed based on the execution of instructions stored on one or more non-transitory computer-readable media. Although illustrated as discrete blocks, various blocks may be divided into additional blocks, combined into fewer blocks, or eliminated, depending on the desired implementation In some embodiments, at step 101, a processor of a computer having memory may receive documents from a document database. The database may contain documents and/or messages communicated between numerous people or entities, such as email communications between the personnel of a company.

After documents are received at step 101, in some embodiments a target corpus and a reference corpus may be identified at step 102. In some embodiments, the documents received at step 101 may belong to a single corpus, which may be used as the target corpus. In some embodiments, the documents received at step 101 may be labelled in advance as belonging to more than one corpus, which may be used as one or more target corpuses and/or one or more reference corpuses. For example, the documents may contain a first corpus including documents from a subset of individuals within a larger group of people, and the documents may also contain a second corpus including documents from the larger group of people or from a different group of people altogether. In this example, the first corpus may be used as the target corpus and the second corpus may be used as the reference corpus.

In some embodiments, if the target and reference corpuses for the documents are not labelled in advance, communities in the people communicating in the documents may be identified. Various methods for identifying communities within groups of people are disclosed herein, and may be used to detect overlapping communities within groups of people. The communities identified at step 102 may be used to classify documents into groups based on whether the sender or recipients of the documents belong to the same communities. One or more of these groups of documents may be used as the target corpus, and one or more of these groups of documents may also be used as the reference corpus.

In some embodiments, the reference corpus may also be the corpus of a newspaper, newsgroup, online information source, literature collection, or other publicly available collection of documents or publications. Various collections of documents may be suitable as the reference corpus, as long as the use of words and phrases within the corpus would reflect the normal or commonly-accepted use of the words.

Vector Space Generation

In some embodiments, at step 103, word embeddings may be extracted from the target corpus and the reference corpus. A word embedding may represent a single word (such as "raptor") or a phrase (such as "Reuben Sandwich"). In some embodiments, a word embedding for a phrase may be generated by averaging the word embedding for each word in the phrase.

After the word embeddings for a corpus are extracted, each word embedding may be converted to a vector. In some embodiments, words embeddings extracted from the target corpus and the reference corpus may be converted to vectors. In some embodiments, only the word embeddings that are common to both the target corpus and the reference corpus may be converted to vectors. In some embodiments, only certain subsets of the word embeddings may be converted to vectors, such as where only words in the target corpus and the reference corpus that are related to a particular industry or to a particular subject matter are converted to vectors.

In some embodiments, the word embeddings for the target corpus and for the reference corpus may then be used to produce a vector space for the target corpus and for the reference corpus at step 104. In some embodiments, each vector space may have multiple dimensions and may include a high dimensional space (e.g., hundreds of dimensions or more). Various methods may be used to convert the word embeddings into a vector space in high dimensional space. In some embodiments, a Word-to-Vector (Word2Vec) machine learning model may be used to process the target corpus and the reference corpus and produce a multi-dimension vector for the target corpus and for the reference corpus (e.g., as described in Mikolov et al. "Distributed Representations of Words and Phrases and Their Compositionality," and U.S. Pat. No. 9,037,464 to Mikolov et al., each of which are hereby incorporated by reference for all that they disclose).

In some embodiments, other suitable methods for producing a vector space for a corpus may also be used, such as: Global Vectors (i.e., GloVe); Graphical Models; Latent Semantic Analysis; or Bag-of-Words (i.e., BoW). These methods may be used as an alternative to generate word embeddings in a multi-dimensional space and/or to produce a vector space for a corpus. The processing of a corpus to a vector space using these methods may produce a numeric representation of the word embeddings in a multi-dimensional space.

In some embodiments, machine learning models for producing a vector space, such as the Word2Vec machine learning model, may not require a unique dimension for each word in the vector. In some embodiments, the word embeddings from a corpus may be passed to the Word2Vec machine learning model. The Word2Vec machine learning model may be instructed to convert the corpus to a vector space in a specific number of dimensions such as, for example, 200 dimensions. The Word2Vec machine learning model may accordingly convert the word embeddings in the corpus into a vector space in 200 dimensions, such that each word embedding in the corpus may be a vector in the 200 dimensions. Thus, using the Word2Vec machine learning model, the entire corpus may be represented as a vector space in a 200-dimension space. The number of dimensions may be pre-determined in advance or may be calculated based on the number of word embeddings in the corpus.

In some embodiments, to compare a reference corpus with a target corpus, both corpuses may be processed by the Word2Vec machine learning model to produce a high-dimension vector space representation for each corpus, such as a high-dimension vector space having 200 dimensions. The Word2Vec machine learning model may create a vector space for the reference corpus (i.e., the reference vector space) and another vector space for the target corpus (i.e., the target vector space). To perform a reliable comparison of the reference and target vector spaces, each of the reference and target vector spaces may contain a high number of the word embeddings in the corpus. When creating multiple vector spaces, the value of each individual axis in the reference vector space and the target vector space may be different. Thus, after processing by the Word2Vec machine learning model, the values for the individual axes in the high-dimensional space for the reference vector space and the target vector space may not be the same.

In order to compare the vector space for the reference corpus and the target corpus, in some embodiments, at step 105, a vector rotation may be performed to align the two vector spaces so that a comparison may be made between them. In some embodiments, the vector rotation may also optionally include a translation to improve the alignment of the two vector spaces. After a vector rotation, words in two different corpuses that are being used in the same manner may have a strong alignment in the vector spaces for the corpuses. Therefore, if the same word is being used in a similar manner in two corpuses, then the vector rotation should produce a strong alignment of the word in the rotated vector space for the two corpuses.

Vector Space Rotation

In some embodiments, a vector rotation of the reference vector space and/or of the target vector space may be performed in order to compare the two vector spaces. A vector space rotation may be performed using various methods to improve the alignment of the same words in the two vector spaces. After the vector rotation is performed to improve the alignment of the two vector spaces, the similarity of two words may be represented by their proximity in the vector space. Words with similar meanings within the two vector spaces may be expected be close together in the vector space, whereas words with different meanings may be expected be far apart in the vector space. The vector rotation to improve alignment may be performed by numerous suitable methods, for example, by a linear transformation approach, by a canonical correlation analysis, or by an orthogonal linear transformation.

In some embodiments, an orthogonal linear transformation may be performed (e.g., as described in Smith et al. "Offline Bilingual Word Vectors, Orthogonal Transformations and the Inverted Softmax", which is hereby incorporated by reference for all that it discloses) to improve the alignment between the two vector spaces. The orthogonal transformation may be performed using an orthogonal matrix O, wherein $O^T O = I$ (the identity matrix). The orthogonal transformation O may be inferred from a dictionary $\{y_i, x_i\}_{i=1 \ldots N}$ of paired words. The dictionary may include a number of words in the reference corpus paired with the same words in the target corpus. The dictionary may include a large number of paired words (e.g., thousands of paired words or more), and the number of paired words in the dictionary may be adjusted up or down based on the number of word embeddings and/or based on the number of dimensions in the vector space.

After the dictionary has been defined, the transformation may be generated by maximizing the cosine similarity of translation pairs in the dictionary as follows:

$$\min_{O} \sum_{i=1}^{n} \|y_i - Ox_i\|^2, \text{ subject to } O^T O = I.$$

Two ordered matrices $X_D$ and $Y_D$ may be formed from the dictionary, such that each row of $\{X_D, Y_D\}$ corresponds to the reference and target word vectors of the corresponding pair in the dictionary. The singular value decomposition (SVD) of M may then be generated as follows:

$$M = X_D^T = U\Sigma V^T$$

M may a square matrix with the same dimensions as the word vectors. U and V may be composed of columns of orthonormal vectors, and $\Sigma$ may be a diagonal matrix including the singular values. The optimized similarity matrix may be generated as follows:

$$S = YUV^T X^T.$$
$$S_{ij} = y_i^T UV^T x_j$$
$$= (U^T y_i) \cdot (V^T x_j)$$

Using orthogonal linear transformation, the two vector spaces may be mapped into a single space. The transformation $V^T$ may be applied to the reference corpus, and the transformation $U^T$ may be applied to the target corpus.

Comparison of Vector Spaces

After the vector space transformation has been performed to improve the alignment of the word embeddings between the reference vector space and the target vector space, at step 106, a comparison may be made of the two vector spaces to identify words in the vector space representation that are not aligned as potential code words. If the same word embedding in the two vector spaces match up after the alignment, then the word is likely being used in the same manner in the two corpuses. If the same word embedding in the two vectors do not match up and are different after the vector rotation, then it is possible that the word is being used as a code word in the target corpus, and the word may thus be labelled as a potential code word in the target corpus.

Figure 2:
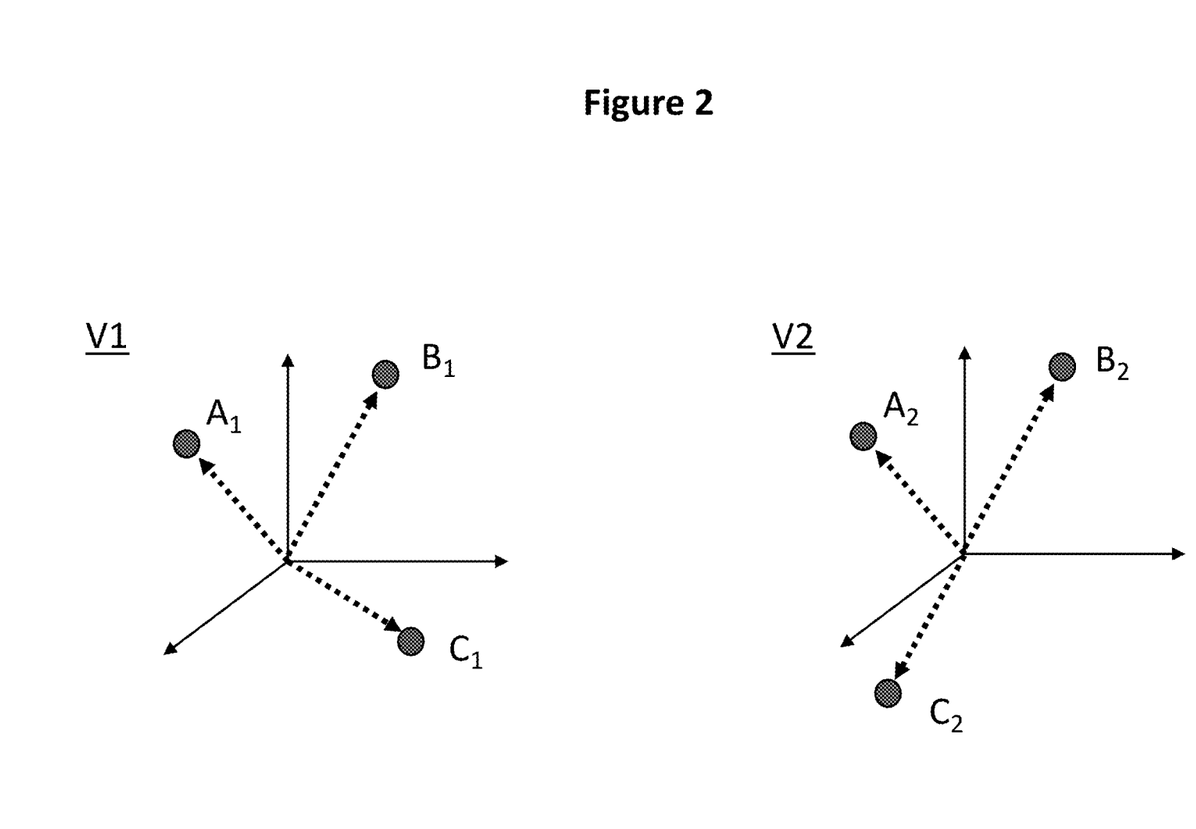
FIG. 2 illustrates two example vector spaces representations of the same word embeddings in two different corpuses.

FIG. 2 illustrates two example vector spaces, each representing the same word embeddings in two different corpuses. In some embodiments, V1 may be the vector space for the reference corpus C1, and V2 may be the vector space for the target corpus C2. The word embeddings in each of the vector spaces V1 and V2 may be represented by the data points A, B and C. The two vector spaces V1 and V2 in FIG. 2 may have already been rotated to improve overall alignment of the word embeddings. In some embodiments, a comparison may be made of each of the word embeddings between the two vector spaces. In this example, the data point $A_1$ in the vector space V1 may align with the data point $A_2$ in the vector space V2. Likewise, the data point $B_1$ in the vector space V1 may align with the data point $B_2$ in the vector space V2. This alignment may suggest that the word embeddings represented by the data points A and B are being used in the same manner in the reference corpus C1 and in the target corpus C2. This alignment between the vector spaces V1 and V2 for the data points A and B may indicate that the word embeddings represented by the data points A and B are not likely being used as code words in the target corpus C2.

In contrast, the data point $C_1$ in the reference vector space V1 may not align with the data point $C_2$ in the target vector space V2. The data point $C_1$ being substantially different in the reference vector space V1 as compared to the data point $C_2$ in the target vector space V2 may indicate a poor alignment between the data point $C_1$ and the data point $C_2$. This lack of alignment between the vector spaces V1 and V2 for the data point C may indicate that the word embedding represented by the data point C is likely being used as code word in the target corpus C2.

In some example embodiments, the comparison of word embeddings between the two vector spaces may be performed using a cosine similarity comparison of the two words. The closer the cosine similarity comparison is to 1, the higher the alignment of the two words and greater the likelihood that the word is being used consistently in the two corpuses. The closer the cosine similarity comparison is to 0, the lower the alignment of the two words, and the greater the likelihood that the word is being used inconsistently in the two corpuses. When the cosine similarity comparison is low, there is a higher probability that the word is being used as a code word in the target corpus. In some embodiments, a threshold may be set whereby an alignment score below a certain threshold indicates that a word is potentially being used as a code word.

Community Detection

Figure 3:
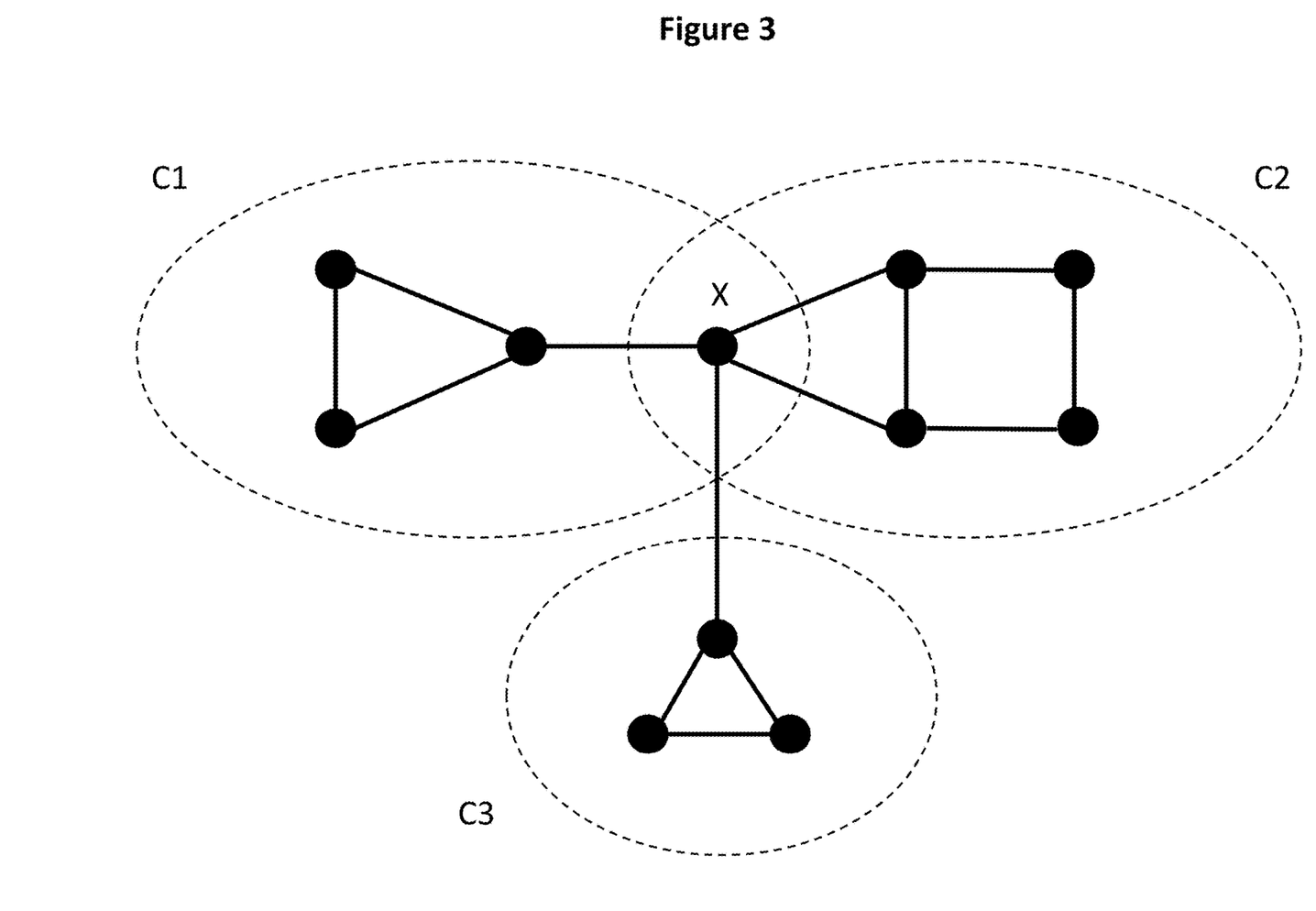
FIG. 3 illustrates an example representation of a group of people including three communities.

FIG. 3 illustrate an example representation of a group of people including three communities: C1, C2 and C3. Each dot may represent a different person in the community, and the lines may represent a connection between two people in the community. Each community one or more include one or more people and the communities may have one or more overlapping people. In this example, person X may be a person who overlaps in both the community C1 and in the community C2. Different communities may use words and phrases in a different manner, which may make identifying code words challenging when processing a group consisting of multiple communities. In order to identify code words being used within and among multiple communities, each community may be viewed as having its own corpus. In one embodiment, the corpuses for multiple communities may be processed using pairwise comparisons to determine whether there are code words that are being used in one or more of the communities.

In some embodiments, a method of identifying potential code words in a large group of people may include dividing the group into smaller communities. The method may involve using multiple pairwise comparison of different communities to determine whether the same words are being used in a different manner between communities. Each community may have a unique group of people and their communications may define a unique corpus within the unique group of people. The communities may be identified in advance or may be identified by analyzing the group of people and/or their communications. Various methods may be employed for identifying communities within a larger group of people (e.g., the method(s) described in Gopalan and Blei, Efficient Discovery of Overlapping Communities in Massive Networks, PNAS Sep. 3, 2013, 110 (36), which is hereby incorporated by reference for all that it discloses). In FIG. 3, there may three communities (e.g., communities C1, C2, and C3), which may include overlapping people (e.g., person X) that belongs in more than one community (e.g., person X belongs in both community C1 and also belongs in community C2). In the example, each community (e.g., communities C1, C2, and C3) may have its own corpus.

In some embodiments, a determination may be made as to whether a particular word is being used as a code word within communities by making pairwise comparisons between the communities. As an example, a determination may be made as to whether the phrase "Reuben Sandwich" is used as a code word for insider trading within the communities C1, C2, and/or C3. Each corpus (e.g., of communities C1, C2, and C3) may be processed through the Word2Vec machine learning model to create a corresponding vector space (e.g., vector spaces V1, V2, and V3) in multiple dimensions for each corpus. These vector spaces (e.g., vector spaces V1, V2, and V3) may be created in high dimensional space (e.g., hundreds of dimensions or more). The vector spaces may then be rotated to improve their alignment with each other.

Figure 4:
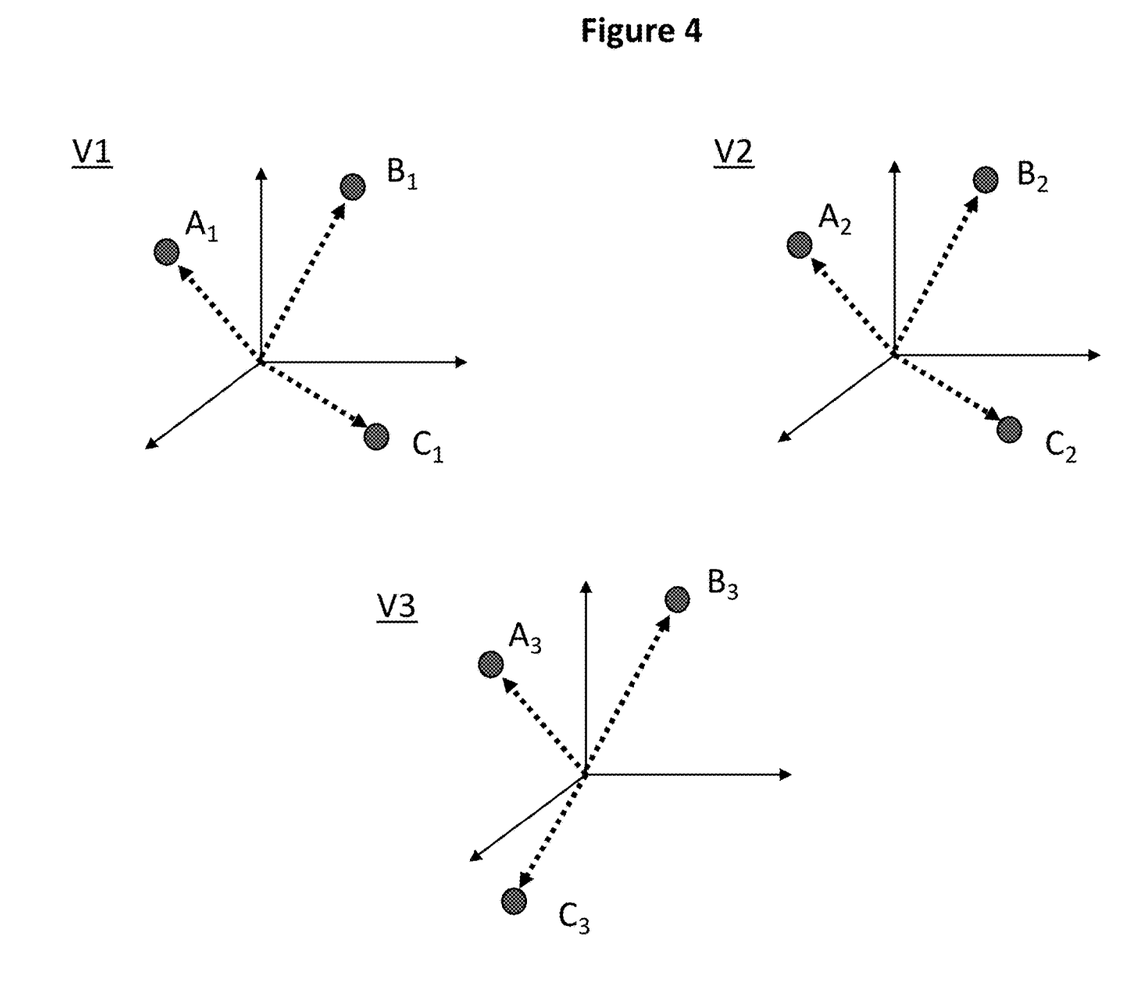
FIG. 4 illustrates three example vector space representations of the same word embeddings in three different corpuses.

FIG. 4 illustrates three example vector spaces representations of the same word embeddings in three different corpuses. For example, the three vector spaces V1, V2, and V3 have already been vector rotated to improve the alignment of the three data points A, B, and C, which represent word embeddings in the three corpuses being processed in the example method. Although only three-word embeddings in the vector space are shown in this example, in practice there may be many more word embeddings in the vector space. In some embodiments, there may be a word embedding for every word or phrase in the corpus, or for every word or phrase in a subset of the corpus.

The vector spaces V1, V2, and V3 in each corpus may be compared in pairs. For example, a pairwise comparison may be performed between V1 and V2. In each pairwise comparison, individual word embeddings may be compared between the two vector spaces. If the data points for the same word have a high similarity in the two vector spaces being compared, then it is likely that the word is not being used as a code word in either corpus (or alternatively it is possible that the word is being used as a code word in both corpuses). If the data points for the same word have a low similarity in the two vector spaces being compared, then it is possible that the word is being used as a code word in one corpus but not the other.

By only comparing the two vector spaces V1 and V2, it may not be possible to determine whether an alignment of the same word between the vector spaces indicates that (1) the word is not being used as a code word in either corpus, or (2) the word is being used as a code word in both corpuses. However, because it is unlikely that the same word would be used as a code word by multiple unrelated communities, by performing multiple pairwise comparisons between different communities of the same word, the disclosed method may determine whether the same word is being used as a code word in some of the communities. If the alignment of the word is the same in the vector space representation of multiple corpuses, then the likelihood is higher that the word is not being used as a code word in any of those corpuses.

In some embodiments, all overlapping word embeddings may be processed in the two corpuses being compared. In some embodiments, only a subset of the word embeddings may be processed in the two corpuses being compared, such as only a subset of words related to a particular industry or subject matter. In some embodiments, the user may select the particular word embeddings that are processed between the two corpuses being compared.

In some embodiments, individual word embeddings in vector spaces V1, V2, and V3 may be compared in pairs between the vector spaces to identify potential code words. For each word embedding, all the pairwise comparisons (for V1, V2, and V3) may be scored and/or ranked based on the alignment of the word embedding between the two vector spaces being compared. After the pairwise comparisons are performed, potential code words may be identified. For each individual word, the poorly aligned pairs among the vector spaces may have a higher probability that the word is being used as a code word in one of the vector spaces in the pair. In contrast, the highly aligned pairs among the vector spaces may have a lower probability that the word is being used as a code word in one of the vector spaces in the pair. In some embodiments, this ranking may be used to identify which corpuses may include potential code words.

FIG. 4 illustrates three example vector spaces V1, V2, and V3 for three corpuses which contain the phrase "Reuben Sandwich," which is represented by the data points $C_1$, $C_2$, and $C_3$, respectively, for each of the vector spaces V1, V2, and V3. Each corpus represents a different community, and the vector for the phrase "Reuben Sandwich" represents the use of the term within the corpus for that community. After a vector rotation has been performed for each of the vector spaces V1, V2, and V3 to improve the overall alignment between the vector spaces, the vectors for the phrase "Reuben Sandwich" may be compared for each corpus. In the vector spaces V1 and V2, the vectors for data points $C_1$ and $C_2$ for the phrase "Reuben Sandwich" may be highly aligned, which may suggest that the phrase "Reuben Sandwich" is being using consistently between the corpuses for the vector spaces V1 and V2. The vector for the data point C3 for the phrase "Reuben Sandwich" in the vector space V3, however, may be different in alignment from the vectors for the data points $C_1$ and $C_2$. This may suggest that the phrase "Reuben Sandwich" is being used differently in the corpus for the vector space V3 than in the corpuses for the vector spaces V1 and V2. The difference in the use of the phrase "Reuben Sandwich" between the communities may indicate that the phrase "Reuben Sandwich" is a code word in the corpus for vector space V3.

In some embodiments, the vectors in FIG. 4 may be combined in pairs and ranked in order of their similarity. For example, there may be three pairs: $C_1$ and $C_2$, $C_1$ and $C_3$, and $C_2$ and $C_3$. The similarity of each pair may be based on an alignment score, such as a cosine similarity comparison score. After the pairs are ordered based on their similarity, lower scored pairs may suggest that the word may be used as a code word between the corresponding corpuses. For example, any word with a score below a certain threshold may be labeled as a code word in the corresponding corpuses.

In some embodiments, higher scored pairs may be combined to reduce the number of pairwise comparisons. In some embodiments, processing may be performed to determine whether a single word embedding (e.g., for the phrase "Reuben Sandwich") is being used as a code word in any community. In this example, the data point $C_1$ in the vector space V1 may have a high alignment with the data point $C_2$ in the vector space V2. Accordingly, in some embodiments the vector spaces V1 and V2 may be combined. This combination may improve the efficiency of the processing because fewer pairwise comparisons may be performed after the combination. More specifically, the vector space V3 may now only be compared to the new combined vector space, rather than being individually compare to both the vector space V1 and to the vector space V2, which may reduce the number of pairwise comparisons performed while identifying potential code words.

Figure 5:
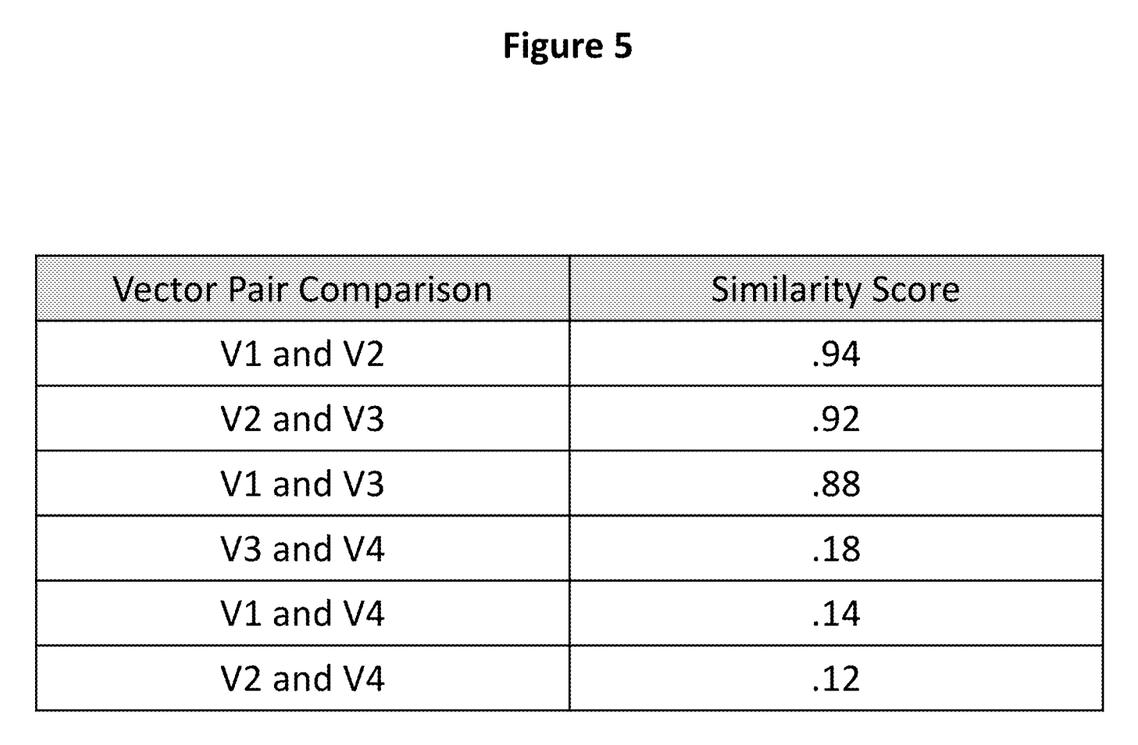
FIG. 5 is a table illustrating an example vector pair comparison chart with pairwise comparisons for four corpuses.

FIG. 5 is a table illustrating an example vector pair comparison chart with pairwise comparisons for four corpuses for four communities: C1, C2, C3, and C4. After processing each corpus through the Word2Vec machine learning model to create a high-dimension vector space representation for each corpus, the vector spaces may be vector rotated so that their word embeddings have improved alignment. The rotated vector spaces for the four corpuses may be represented by the vector spaces V1, V2, V3, and V4. The word vector for a potential code word, such as for the phrase "Reuben Sandwich," may then be compared between the vector space V1, V2, V3, and V4s. This is done by making pairwise comparisons between the vector spaces V1, V2, V3, and V4. In this example, since there are four vector spaces V1, V2, V3, and V4, there may be six pairwise comparisons.

In the pairwise comparisons, the word vectors in each vector space may be compared for high or low similarity by pairs. In some embodiments, a similarity score may be calculated, such as by using a cosine similarity comparison method. The pairs may then be ordered according to their similarity comparison. In the example in FIG. 5, the first three pairwise comparisons may yield high similarity scores for the potential code word, while the last three pairwise comparisons may yield low similarity scores for the potential code word. In this example, the similarity scores may suggest that there is a code word that exists between the last three pairs in the chart. Analyzing the pairs in the chart may suggests that the code word is being used in vector space V4, which may correspond to corpus 4, because the code word yields a low similarity score with all the other corpuses.

In some embodiments, comparisons may be performed for all the potential pairwise comparisons of the communities being processed for code words. For example, where are N number of communities, the number of pairwise comparisons may be $N*(N-1)/2$. In situations where there are a large number of communities, this may result in a high number of pairwise comparisons. In some embodiments, only a subset of the potential pairwise combinations of communities may be compared. Each corpus may be compared to a fixed or user-selected number of other corpuses. As an example, each corpus may be compared with at most a fixed number of other corpuses, such as ten other corpuses for example. The ten other corpuses may be selected at random from the communities, or may be selected using an algorithm, which may limit the number of comparisons performed where there are large numbers of communities.

In some embodiments, once the similarity scores for a potential code word have been calculated for all the pairwise comparison of corpuses, then a confidence threshold or interval may optionally be used to determine which corpuses have potential code words. A threshold may include a similarity score under which a pair is presumed to potentially include a code word, and/or a similarity score above which a pair is presumed to potentially not include a code word. An interval may include a gap between a higher group of similarity scores and a lower group of similarity scores. If the interval is greater than a certain limit, than the higher group of similarity scores may be presumed to potentially not include a code word, whereas the lower group of similarity scores may be presumed to potentially include a code word. In some embodiments, the number of pairwise comparisons which have a higher score or a lower score for a particular word may be used to determine whether the particular word is potentially being used as a code word in the corpuses being scored in the comparisons.

In some embodiments, the example methods disclosed herein may be integrated into the practical application of automatically identifying potential code words in documents in a manner that is more efficient and more accurate than could be accomplished using conventional human analysis and human key word searching. For example, the example method disclosed herein may be employed in a large financial institution with thousands of employees who collectively generate millions of documents (e.g., emails or other documents) every day. A human chief compliance officer of the financial institution may be tasked with monitoring the millions of daily emails of the employees each day to make sure that insider trading is not going undetected in the emails. However, to prevent detection, employees may use codewords to discuss their insider trading activities. Using conventional human analysis and human key word searching, the chief compliance officer of the financial institution may attempt to manually analyze and manually search through the emails of the employees for code words related to insider trading. However, using these manual conventional techniques, the chief compliance officer may only begin to scratch the surface of all of the potential key words in the millions of daily emails. In contrast, using the example methods disclosed herein, a machine learning model and related computer processing may efficiently and accurately analyze and identify potential code words in the millions of daily emails, automatically and without human involvement or intervention. Thus, using the example methods disclosed herein, the chief compliance officer can efficiently and accurately be informed of potential code words, as well as specific emails that contain the potential code words, to prevent insider trading from going undetected in the financial institution. In some embodiments, the example methods disclosed herein may be integrated into other practical applications, such as identifying code words in compliance with the Foreign Corrupt Practices Act (FCPA), in efforts to detect money laundering, in efforts to detect code words used in secret projects for technology companies or secret drugs for pharmaceutical companies.

In some embodiments, in addition to analyzing the context in which potential code words appear in an effort to detect the potential code words, a behavioral analysis may also be performed in order to detect potential code words. This behavioral analysis may include analyzing a frequency with which the code word appears in documents (e.g., one each week, or once each month, or some other frequency such as an anomalous frequency). For example, if an employee states the following in an email "Hey, I had a Rueben sandwich for lunch today, you should buy it ASAP," the context of lunch that appears in the email may not be enough to detect that the phrase "Rueben sandwich" is a code word. Therefore, in addition to analyzing the context in which the phrase "Rueben sandwich" is used, the behavior of how the phrase "Rueben sandwich" is used may additionally be analyzed, for example in terms of frequency of use. For example, how often a person recommends a "Reuben sandwich" to other people may be analyzed. If the frequency is relatively low, and there is no obvious pattern, then the phrase "Reuben sandwich" may not be considered to be a potential code word. In contrast, if the frequency is relatively high, and there is obvious pattern (e.g., they are recommending a "Reuben sandwich" at noon every Wednesday to another person), then the phrase "Reuben sandwich" may be considered to be a potential code word.

Figure 6:
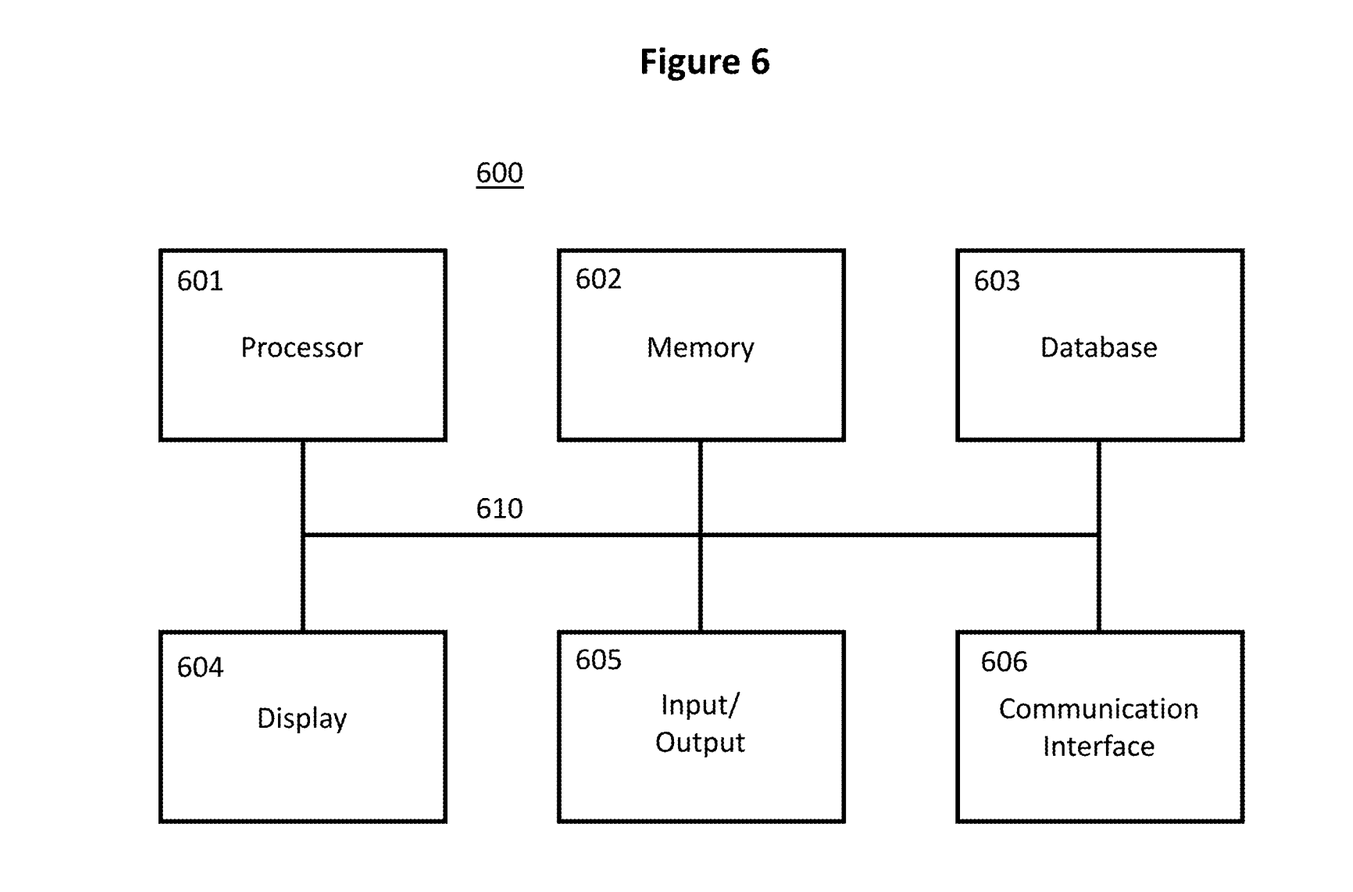
FIG. 6 depicts a block diagram illustrating an example computing system for execution of operations of various embodiments of the disclosure.

FIG. 6 shows a system architecture adapted to support one or more embodiments. FIG. 6 depicts a block diagram illustrating an example computing system 600 for execution of the operations of various embodiments of the disclosure. As shown, the computing system 600 for implementing the subject matter disclosed herein may include a processing unit 601, memory 602, database/storage 603, display 604, data input/output (I/O) module 605, communication interface 606, and a bus 610 that couples elements 601-606.

The bus 610 may include any type of bus architecture. Examples include a memory bus, a peripheral bus, a local bus, etc. The computing system 600 is an instruction execution machine, apparatus, or device and may include a microprocessor, a digital signal processor, a graphics processing unit, an application specific integrated circuit (ASIC), a field programmable gate array (FPGA), etc. The processing unit 601 may be configured to execute program instructions stored in memory 602 and/or database/storage 603 and/or received via data I/O module 605.

The memory 602 may include read only memory (ROM) and random access memory (RAM). Memory 602 may be configured to store program instructions and data during operation of computing system 600. In various embodiments, memory 602 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 602 may also include nonvolatile memory technologies such as nonvolatile flash RAM (NVRAM) or ROM. In some embodiments, it is contemplated that memory 602 may include a combination of technologies such as the foregoing, as well as other technologies not specifically mentioned. When the subject matter is implemented in a computer system, a basic input/output system (BIOS), containing the basic routines that help to transfer information between elements within the computer system, such as during start-up, may be stored in ROM.

The database/storage 603 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the computing system 600.

It is noted that the methods described herein may be embodied in executable instructions stored in a computer readable medium for use by or in connection with an instruction execution machine, apparatus, or device, such as a computer-based or processor-containing machine, apparatus, or device. In some embodiments, other types of computer readable media may be used which may store data that is accessible by a computer, such as magnetic cassettes, flash memory cards, digital video disks, RAM, ROM, and the like may also be used in the example operating environment. As used here, a "computer-readable medium" may include one or more of any suitable media for storing the executable instructions of a computer program in one or more of an electronic, magnetic, optical, and electromagnetic format, such that the instruction execution machine, system, apparatus, or device may read (or fetch) the instructions from the computer readable medium and execute the instructions for carrying out the described methods. A non-exhaustive list of conventional example computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored in memory 602, including an operating system, one or more applications programs, program data, and other program modules. A user may enter commands and information into the computing system 600 through data I/O module 605. Data I/O module 605 may include mechanisms such as a keyboard, a touch screen, a pointing device, etc. Other external input devices (not shown) may be connected to the system via data I/O module 605. In some embodiments, external input devices may include video or audio input devices such as a video camera, a still camera, etc. Data I/O module 605 may be configured to receive input from one or more users of computing system 600 and to deliver such input to processing unit 601 and/or memory 602 via bus 610.

A display 604 may also be connected to the bus 610. Display 604 may be configured to display output of computing system 600 to one or more users. In some embodiments, a given device such as a touch screen, for example, may function as both data entry module and display. Other peripheral output devices, not shown, such as speakers and printers, may be connected to the computing system 600.

The computing system 600 may operate in a networked environment using logical connections to one or more remote nodes (not shown) via communication interface 606. The remote node may be another computer, a server, a router, a peer device or other common network node, and typically includes many or all of the elements described above relative to the computing system 600. The communication interface 606 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 606 may include logic configured to support direct memory access (DMA) transfers between memory 602 and other devices.

In a networked environment, program modules depicted relative to the computing system 600, or portions thereof, may be stored in a remote storage device, such as, for example, on a server. In some embodiments, other hardware and/or software to establish a communications link between the computing system 600 and other devices may be used.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

The illustrated and described method elements may not be strictly independent or unitary method steps. One or more of the illustrated elements (steps) may be combined with one or more of the other elements. Likewise, one or more of the illustrated method elements may be separated into one or more constituent sub-elements or sub-steps. These steps and sub-steps may be performed by the same or different hardware components and software processes, such as those shown in FIG. 6. At least one component defined by the claims may be implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Example embodiments of the disclosed subject matter have been disclosed in an illustrative style. Accordingly, the terminology employed throughout should be read in an example rather than a limiting manner. Although minor modifications to the teachings herein may occur to those well versed in the art, it shall be understood that what is intended to be circumscribed within the scope of the patent warranted hereon are all such embodiments that reasonably fall within the scope of the advancement to the art hereby contributed, and that scope shall not be restricted, except in light of the appended claims and their equivalents.

The invention claimed is:

1. A computer-implemented method for identifying documents that contain potential code words using a machine learning model, at least a portion of the method being performed by a computer system comprising one or more processors, the method comprising:
    identifying, by the computer system, a plurality of document corpuses from a plurality of documents;
    extracting, by the computer system, a set of word embeddings from each of the plurality of document corpuses such that multiple sets of word embeddings are extracted;
    generating, by the computer system, a plurality of vector spaces for the sets of word embeddings using a machine learning model, with each set of word embeddings having a unique vector space;
    grouping, by the computer system, the plurality of vector spaces in pairs, such that a first vector space of the plurality of vector spaces is grouped with a second vector space of the plurality of vector spaces in a first pair and a third vector space of the plurality of vector spaces in a second pair;
    comparing, by the computer system, the word embeddings of the vector spaces that are paired to generate an alignment score for each pair of vector spaces;
    identifying, by the computer system, a word embedding as a potential code word based on the alignment score between the vector spaces that are paired being below a threshold; and
    identifying, by the computer system, one or more documents that contain the potential code word.

2. The method of claim 1, further comprising:
    in response to a comparison of the word embeddings of a pair of vector spaces having a comparison score above a threshold, combining the vector spaces of the pair of vector spaces;
    grouping the combined vector spaces with another vector space of the plurality of vector spaces in a third pair; and
    comparing the word embeddings of the vector spaces of the third pair,
    wherein the word embedding is identified as the potential code word is further based on the comparison of the word embeddings of the vector spaces of the third pair.

3. The method of claim 1, further comprising:
    assigning a comparison score to each of the vector space pairs based on the comparison of the word embeddings of the vector spaces that are paired; and
    ranking the vector space pairs based on the comparison scores,
    wherein the word embedding is identified as the potential code word based on the ranking of the vector space pairs.

4. The method of claim 1, further comprising before grouping the plurality of vector spaces in pairs, selecting a first group of the plurality of vector spaces, wherein grouping the plurality of vector spaces in pairs includes grouping each of the plurality of vector spaces not included in the first group with at least one of the vector spaces in the first group to form vector space pairs.

5. The method of claim 1, further comprising performing a vector rotation of one or more vector spaces of the plurality of vector spaces to improve alignment of the plurality of vector spaces.

6. The method of claim 1, wherein the generating of the plurality of vector spaces using a machine learning model further comprises generating the plurality of vector spaces using a Word2Vec machine learning model.

7. The method of claim 1, wherein comparing the word embedding s of the vector spaces that are paired comprises performing a cosine similarity comparison.

8. The method of claim 1, wherein the documents include emails.

9. One or more non-transitory computer-readable media comprising one or more computer-readable instructions that, when executed by one or more processors of a system, cause the system to perform the method of claim 1.

10. A system comprising:
one or more non-transitory computer-readable media comprising one or more computer-readable instructions; and
one or more processors configured to execute the computer-readable instructions to cause the system to perform operations, the operations comprising:
identifying a plurality of document corpuses from a plurality of documents;
extracting a set of word embeddings from each of the plurality of document corpuses such that multiple sets of word embeddings are extracted;
generating a plurality of vector spaces for the sets of word embeddings using a machine learning model, with each set of word embeddings having a unique vector space;
selecting a first group of the plurality of vector spaces;
grouping the plurality of vector spaces in pairs, such that each of the plurality of vector spaces not included in the first group is grouped with at least one of the vector spaces in the first group to form vector space pairs;
comparing the word embeddings of the vector spaces that are paired;
identifying a word embedding as a potential code word based on the comparisons of the word embeddings of the vector spaces that are paired; and
identifying one or more documents that contain the potential code word.

11. The system of claim 10, wherein the operations further comprise:
in response to a comparison of the word embeddings of a pair of vector spaces having a comparison score above a threshold, combining the vector spaces of the pair of vector spaces;
grouping the combined vector spaces with another vector space of the plurality of vector spaces in a third pair; and
comparing the word embeddings of the vector spaces of the third pair,
wherein the word embedding is identified as the potential code word is further based on the comparison of the word embeddings of the vector spaces of the third pair.

12. The system of claim 10, wherein the operations further comprise:

assigning a comparison score to each of the vector space pairs based on the comparison of the word embeddings of the vector spaces that are paired; and
ranking the vector space pairs based on the comparison scores,
wherein the word embedding is identified as the potential code word based on the ranking of the vector space pairs.

13. The system of claim 12, wherein identifying the word embedding as the potential code word includes identifying a vector space that includes the word embedding based on the vector space pairs that include the vector space having a similarity score lower than a threshold score.

14. The system of claim 10, wherein the operations further comprise performing a vector rotation of one or more vector spaces of the plurality of vector spaces to improve alignment of the plurality of vector spaces.

15. The system of claim 10, wherein the identifying of the word embedding as the potential code word further comprises identifying the potential code word where an alignment score between the vector spaces that are paired is below a threshold.

16. The system of claim 10, wherein the generating of the plurality of vector spaces using a machine learning model further comprises generating the plurality of vector spaces using a Word2Vec machine learning model.

17. The system of claim 10, wherein the documents include emails.

18. A computer-implemented method for identifying documents that contain potential code words using a machine learning model, at least a portion of the method being performed by a computer system comprising one or more processors, the method comprising:
extracting, by the computer system, a set of word embeddings from each of a plurality of document corpuses such that multiple sets of word embeddings are extracted;
generating, by the computer system, a plurality of vector spaces for the sets of word embeddings using a machine learning model, with each set of word embeddings having a unique vector space;
performing a vector rotation of one or more vector spaces of the plurality of vector spaces to improve alignment of the plurality of vector spaces;
grouping, by the computer system, the plurality of vector spaces in pairs, such that a first vector space of the plurality of vector spaces is grouped with a second vector space of the plurality of vector spaces in a first pair and a third vector space of the plurality of vector spaces in a second pair;
comparing, by the computer system, the word embeddings of the vector spaces that are paired;
identifying, by the computer system, a word embedding as a potential code word based on the comparisons of the word embeddings of the vector spaces that are paired; and
identifying, by the computer system, one or more documents that contain the potential code word.

19. The method of claim 18, wherein the identifying of the word embedding as the potential code word further comprises identifying the potential code word where an alignment score between the vector spaces that are paired is below a threshold.

20. A computer-implemented method for identifying documents that contain potential code words using a machine learning model, at least a portion of the method being performed by a computer system comprising one or more processors, the method comprising:

extracting, by the computer system, a set of word embeddings from each of a plurality of document corpuses such that multiple sets of word embeddings are extracted;

generating, by the computer system, a plurality of vector spaces for the sets of word embeddings using a machine learning model, with each set of word embeddings having a unique vector space;

grouping, by the computer system, the plurality of vector spaces in pairs, such that a first vector space of the plurality of vector spaces is grouped with a second vector space of the plurality of vector spaces in a first pair and a third vector space of the plurality of vector spaces in a second pair;

comparing, by the computer system, the word embeddings of the vector spaces that are paired;

combining, based on the comparisons, a pair of vector spaces;

grouping the combined vector spaces with another vector space of the plurality of vector spaces in a third pair;

comparing, by the computer system, the word embeddings of the third pair of vector spaces;

identifying, by the computer system, a word embedding as a potential code word based on the comparisons of the word embeddings of the vector spaces that are paired; and identifying, by the computer system, one or more documents that contain the potential code word.

* * * * *